Dec. 27, 1927.
A. J. MERTEN
1,654,009
WHEEL PULLER
Filed Nov. 29, 1924
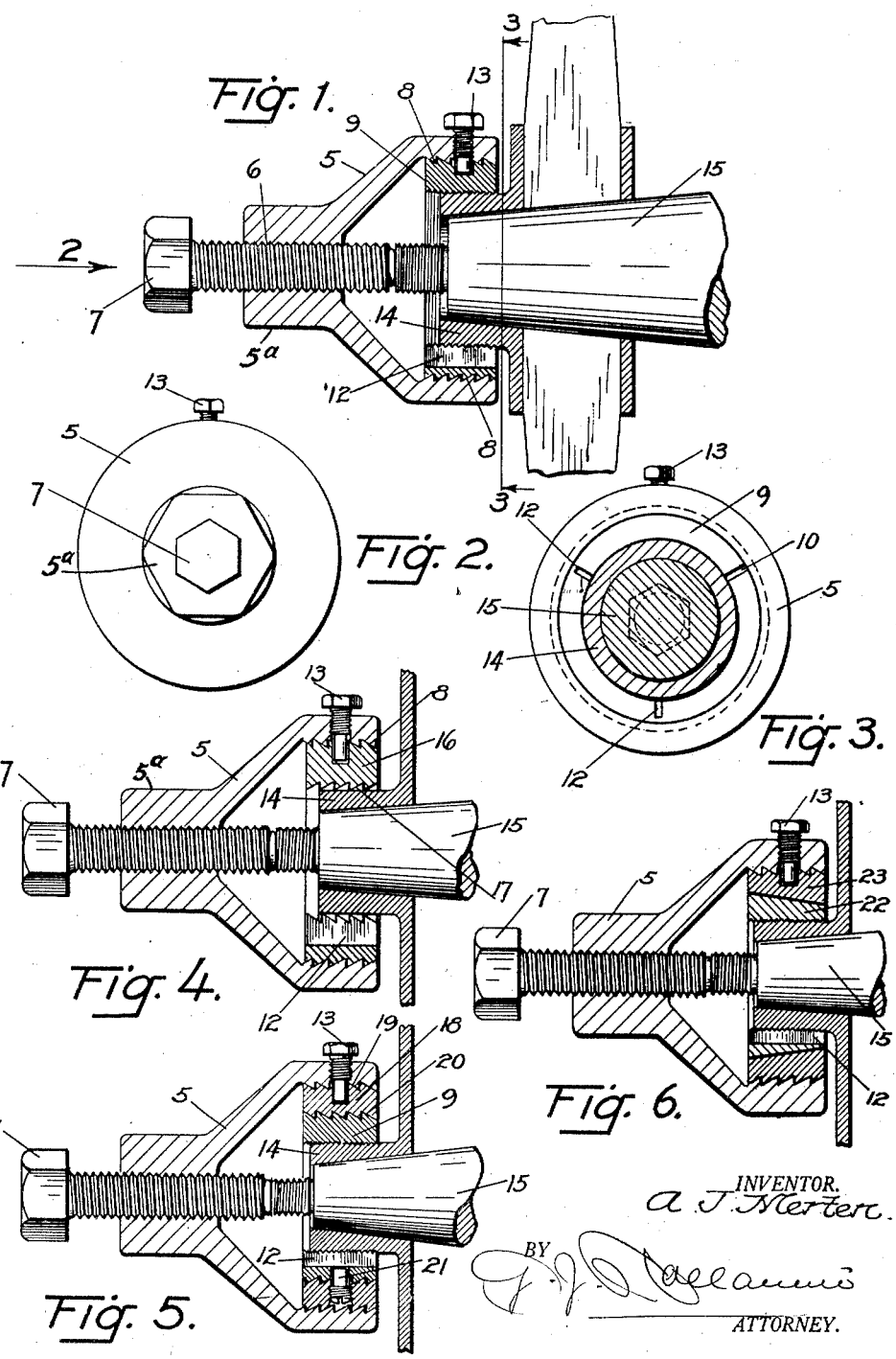
INVENTOR.
A. J. Merten.
BY
ATTORNEY.

Patented Dec. 27, 1927.

1,654,009

UNITED STATES PATENT OFFICE.

ARTHUR J. MERTEN, OF COLORADO SPRINGS, COLORADO.

WHEEL PULLER.

Application filed November 29, 1924. Serial No. 752,984.

My invention relates to pullers of the type used in removing wheels from their axles on automobiles and other vehicles and its primary object is to provide in a device of this type, an adapter-member of novel construction, which intensifies the gripping action of the puller upon the hub of a wheel to which it is applied.

Another object of the invention resides in the provision of an auxiliary member for fitting the device to hubs of different diameters and still further objects are to be found in details of construction as will fully appear in the course of the following description made with reference to the accompanying drawings.

While my invention is particularly adapted for use in removing wheels from their axles it may be advantageously employed for the separation of component parts of other machine elements, as for example, bearing races and timing gears, and it is to be understood that in view of this universal use of the device, variations in the form and arrangement of its parts may be resorted to without departing from the scope of the invention as defined in the hereunto appended claims.

In the drawings in the several views of which like parts are similarly designated, Figure 1 represents a sectional elevation of my improved puller in its operative relation to the hub and axle of a wheel;

Figure 2 an end view of the device looking in the direction of the arrow 2 in Figure 1;

Figure 3, an opposite end view of the puller looking in the direction of the arrow 3 in Figure 1; and Figures 4, 5 and 6, views similar to Figure 1, showing modifications in the construction of the device to adapt it for use under different conditions.

Referring first to Figures 1 to 3 inclusive, the puller consists of a hollow body 5 having an axial screw-threaded bore 6 for its co-operative connection with the headed puller-screw 7 and a reduced angular portion 5ª forming a head for the application of a wrench.

The opposite open end of the body has an internal buttress thread 8 which is co-operatively engaged by a corresponding external thread on an annular adapter 9 which is internally screw threaded for the application of the device to the hub of the wheel to be removed.

The adapter is radially split and grooved as shown at 10 and 12 in Figure 3 for the purpose of permitting it to contract upon the part it engages, by a relative axial movement of the body, under the wedging influence of the coordinated buttress threads.

A set screw 13 on the body extends loosely in an opening of the adapter to hold the latter against independent rotation.

In the application of the device to a wheel of the general construction illustrated in the drawings, the puller is screwed upon the externally screw-threaded hub 14 of the wheel and the screw 7 is moved in engagement with the end of the axle 15 of the same after the cap and the nut which normally are screwed upon these parts, have been removed.

When by longitudinal pressure upon the end of the axle through further rotation of the screw, the wheel is compelled to slide outwardly on the axle, the buttress teeth on the axially moving body produce by engagement with the corresponding teeth on the adapter, a wedging action which causes the annulus to contract upon the hub, it being understood that the set screw 13 is loose in the opening of the adapter so as to permit of a limited movement of the latter within the body of the device.

The clamping action of the adapter on the hub relieves the screw threads of the latter from damaging stress, while it insures a rigid connection between the puller and the hub proportionate to the force required to remove the wheel from the axle.

For the use of the puller on a wheel hub or other machine part having a smooth surface, the device is provided with an adapter 16 having internal buttress teeth 17 as illustrated in Figure 4, which bite into the smooth surface when the adapter is contracted in the operation of the appliance as hereinbefore described.

In order to adapt the puller to hubs or other machine parts of differing diameters, a fitting-ring 18 is interposed between the adapter and the body of the device as shown in Figures 5 and 6.

In the construction of Figure 5, the ring 18 has an external buttress thread 19 which engages with the internal thread of the body 5, and it is provided with a correspondingly formed internal thread 20 which co-operates with the external thread of the adapter 9.

It will be apparent that the provision of the fitting ring adapts the body of the puller shown in Figure 1 for use on hubs of smaller diameter and that by providing a number of adapters of different sizes with one body and one fitting ring, the appliance is readily adjusted to any one of a plurality of machine parts of different external diameters.

A set screw 21 is employed to connect the adapter and the fitting-ring against independent rotation.

In the modification illustrated in Figure 6, the annular adapter 22 and the fitting ring 23 are connected by the frictional contact of smooth tapering surfaces, thereby eliminating both the screw threads and the set-screw of the form shown in Figure 5.

The use of a buttress thread as in the other form of the invention is, however, preferable not only for the reason that it provides a positive and dependable method of forcing the adapter to clamping engagement with the hub, but also because it tends to hold the adapter firmly against axial movement while the device is applied.

It will be understood that the advantages of an abrupt taper can be had with a buttresss thread of any desired length without material variation in the diameter of the adapter.

Having thus described my invention, what I claim and desire to secure by Letters Patent is:

1. A puller of the character described, comprising a hollow body, a radially-contractible, annular adapter split throughout its length and longitudinally grooved for its ready and uniform contraction, the adapter and the body having cooperating buttress screw-threads to effect the contraction of the former by axial movement of the latter, and a screw on the body to effect its longitudinal movement by engagement with a relatively stationary object.

2. A wheel puller of the character described, comprising an annular body, a radially-contractible adapter, the adapter and the body having cooperating buttress screw-threads to effect the contraction of the former by axial movement of the latter, a set-screw cooperating with the adapter and the body to cause the two to rotate conjunctively, said set-screw passing through the body, thereby being accessible from the exterior of the puller when it is in its operative position on a wheel, and a screw on the body to effect its longitudinal movement by engagement with a relatively stationary object.

In testimony whereof I have affixed my signature.

ARTHUR J. MERTEN.